(12) United States Patent
Beylier et al.

(10) Patent No.: US 12,455,502 B2
(45) Date of Patent: Oct. 28, 2025

(54) DEVICE AND METHOD FOR GENERATING PHOTOMASKS

(71) Applicants: STMicroelectronics (Crolles 2) SAS, Crolles (FR); STMicroelectronics France, Montrouge (FR)

(72) Inventors: Charlotte Beylier, Meylan (FR); Mauricio Garcia Suarez, Santiago (CL); Pascal Urard, Theys (FR); Guillaume Landie, Lumbin (FR)

(73) Assignees: STMicroelectronics (Crolles 2) SAS, Crolles (FR); STMicroelectronics France, Montrouge (FR)

( * ) Notice: Subject to any disclaimer, the term of this patent is extended or adjusted under 35 U.S.C. 154(b) by 344 days.

(21) Appl. No.: 17/983,972

(22) Filed: Nov. 9, 2022

(65) Prior Publication Data

US 2023/0141388 A1  May 11, 2023

(30) Foreign Application Priority Data

Nov. 10, 2021 (FR) ...................................... 2111964

(51) Int. Cl.
| | | |
|---|---|---|
| *G06F 30/27* | (2020.01) | |
| *G03F 1/70* | (2012.01) | |
| *G03F 7/00* | (2006.01) | |
| *G06F 30/30* | (2020.01) | |
| *G06F 30/398* | (2020.01) | |

(Continued)

(52) U.S. Cl.
CPC ............... *G03F 1/70* (2013.01); *G03F 7/705* (2013.01); *G06F 30/27* (2020.01); *G06F 30/398* (2020.01); *G06N 3/094* (2023.01); *G06F 2119/18* (2020.01); *G06N 3/0455* (2023.01); *G06N 3/0475* (2023.01)

(58) Field of Classification Search
None
See application file for complete search history.

(56) References Cited

U.S. PATENT DOCUMENTS

| | | | |
|---|---|---|---|
| 7,930,653 B2 * | 4/2011 | Ivansen ............... | G03F 7/70291 716/54 |
| 11,061,318 B2 * | 7/2021 | Lo ....................... | G03F 7/70516 |

(Continued)

FOREIGN PATENT DOCUMENTS

| | | |
|---|---|---|
| EP | 3789923 A1 | 3/2021 |
| FR | 2903518 A1 | 1/2008 |

(Continued)

OTHER PUBLICATIONS

INPI Search Report and Written Opinion for priority application, FR 2111964, report dated Aug. 31, 2022, 16 pgs.

(Continued)

*Primary Examiner* — Leigh M Garbowski
(74) *Attorney, Agent, or Firm* — Crowe & Dunlevy LLC

(57) ABSTRACT

The present description concerns a method that includes the compression, by a processor, of an image comprising first patterns by transforming the image into a first representation formed of two-point elements. The method also includes the execution, by a neural network, of an inference operation on the first representation to generate a second representation formed of two-point elements. The method further includes the generation of a lithographic mask based on the decompression of the second representation.

17 Claims, 10 Drawing Sheets

(51) Int. Cl.
*G06N 3/094* (2023.01)
*G06F 119/18* (2020.01)
*G06N 3/0455* (2023.01)
*G06N 3/0475* (2023.01)

(56) References Cited

U.S. PATENT DOCUMENTS

| | | | |
|---|---|---|---|
| 11,762,283 B2 * | 9/2023 | Poonawala | G03F 7/70441 |
| | | | 716/51 |
| 2020/0380362 A1 | 12/2020 | Cao et al. | |
| 2021/0181620 A1 | 6/2021 | Poonawala et al. | |
| 2022/0335333 A1 * | 10/2022 | Cao | G06N 3/047 |

FOREIGN PATENT DOCUMENTS

| | | | | |
|---|---|---|---|---|
| KR | 20100031664 A * | 3/2010 | | G06F 1/68 |
| WO | 2021052712 A1 | 3/2021 | | |

OTHER PUBLICATIONS

Gupta, Rachit: ASML Freeform OPC+ Update, Product Marketing, Sep. 3, 2019, 8 pgs.

Ronneberger Olaf et al: "U-Net: Convolutional Networks for Biomedical Image Segmentation : 18th International Conference, Munich, Germany, Oct. 5-9, 2015, Proceedings, Part III" In: "Pattern Recognition : 5th Asian Conference, ACPR 2019, Auckland, New Zealand, Nov. 26-29, 2019, Revised Selected Papers, Part II", Jan. 1, 2015 (Jan. 1, 2015), Springer International Publishing, Cham, XP055940098, 8 pgs.

Shelhamer Evan et al: "Fully Convolutional Networks for Semantic Segmentation", IEEE Transactions on Pattern Analysis and Machine Intelligence, vol. 39, No. 4, Apr. 1, 2017 (Apr. 1, 2017), pp. 640-651, XP055865277.

* cited by examiner

DEVICE AND METHOD FOR GENERATING PHOTOMASKS

PRIORITY CLAIM

This application claims the priority benefit of French Application for Patent No. 2111964, filed on Nov. 10, 2021, the content of which is hereby incorporated by reference in its entirety to the maximum extent allowable by law.

TECHNICAL FIELD

The present disclosure generally concerns the field of photolithography and, more particularly, the generation of photomasks.

BACKGROUND

Photolithography is a technique used in the field of microelectronics to print patterns from a mask to the surface of a structure.

Photolithography generally involves the deposition of a photoresist layer on the surface of a substrate. The patterns to be copied are defined by a mask formed of opaque areas and of transparent areas. These patterns are transferred to the photoresist by applying a light radiation through the mask.

Due to optical effects, particularly relating to the effects of diffraction, the patterns obtained on the resin are not necessarily identical to the patterns present on the photomask.

A difficulty then is to estimate or to compensate for these optical effects. There exist tools enabling generation of photomasks taking these effects into account. However, these tools have poor efficiency and poor accuracy. Also, the tools are cumbersome and expensive in terms of time and processing resources.

There is a recurrent need to improve lithographic mask design techniques. In particular, there is a need to generate efficient photomasks while making the generation process less time-consuming and processing resource-consuming. Indeed, there is a need to overcome all or part of the disadvantages of known lithographic mask design techniques. As such, further development is needed.

SUMMARY

An embodiment provides the use of a neural network to generate modifications of data of patterns representing a circuit. This neural network processes a mathematical representation selected to compress the data describing the circuit.

An embodiment provides a method that includes: compressing, by a processor, an image having first patterns by transforming the image into a first representation formed of two-point elements; executing, by a neural network, an inference operation on the first representation to generate a second representation formed of two-point elements; and generating a lithographic mask based on the decompression of the second representation.

According to an embodiment, the method includes the use of the lithographic mask to obtain by lithography patterns on photoresist covering a substrate of a wafer by lithography and then performing an etching process to form corresponding patterns in the substrate.

According to an embodiment, the image is represented in vector format.

According to an embodiment, the image covers a surface contained in a plane and the compression of said image includes: projecting a vertex of a first polygon of the image onto a first point of a first curve running throughout a first surface of the plane; and projecting the vertex onto a second point of a second curve running throughout a second surface around the first point, the second surface having an area smaller than the area of the first surface.

According to an embodiment, the first and/or the second surface is a rectangle.

According to an embodiment, the first and/or the second surface is a right-angled triangle.

According to an embodiment, the first and/or the second surface includes first and second right-angled triangles arranged as a rectangle, and the first representation includes a bit indicating in which of the first and the second triangle the first and/or the second point is located.

According to an embodiment, the first surface is a rectangle, and the second surface includes at least one right-triangle.

According to an embodiment, the image is formed of a plurality of polygons, the two-point compression includes the two-point compression of each vertex of each polygon, and the two-point compression of at least certain perimetric points of each polygon which are not vertices.

According to an embodiment, the method includes comparing the length of each edge of each polygon with a threshold length and, if the length of an edge exceeds the threshold length, compressing at least one perimetric point on this edge.

According to an embodiment, the threshold length is shorter than the minimum distance separating any two polygons from among the plurality of polygons.

According to an embodiment, the method also includes segmenting the image into a plurality of sub-images, the steps of compressing and generating a mask being applied to each of the sub-images.

An embodiment provides a method of training a neural network to generate lithographic masks, the method including: generating, at least partially by the neural network, of an image representing a lithographic mask; estimating, by using a lithographic simulation tool, a pattern resulting from the use of the mask; comparing the resulting pattern and a reference pattern; and modifying one or a plurality of parameters of the neural network based on the comparison. The image representing the lithographic mask may then be printed on a support to produce the lithographic mask, and the lithographic mask may be used to obtain patterns on a photoresist covering a substrate of a wafer by lithography and then an etching process may be performed to form corresponding patterns in the substrate.

According to an embodiment, generating the image includes: compressing, by an algorithm implemented by a data processing device, a first image containing first patterns, by transforming the image into a first representation formed of two-point elements; applying the first representation to the neural network to generate a second representation formed of two-point elements; and generating the image based on a decompression of the second representation.

According to an embodiment, the neural network is a generative adversarial network including a generator network being a first autoencoder and a discriminator network being a second autoencoder.

According to an embodiment, the first autoencoder and/or the second autoencoder is of U-net type.

According to an embodiment, the training of the neural network is performed iteratively and, at each iteration: a loss is calculated by using a loss function based on the comparison between the resulting pattern and a reference pattern; and the modification of one or a plurality of parameters of the network includes updating synaptic weights of the neural network based on the calculated loss.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional, and material properties.

For the sake of clarity, the steps and elements that are useful for an understanding of the embodiments described herein have been illustrated and described in detail. The photolithography techniques and operations have not been described in detail.

Unless indicated otherwise, when reference is made to two elements connected together, this signifies a direct connection without intermediate elements other than conductors, and when reference is made to two elements coupled together, this signifies that these two elements can be connected, or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
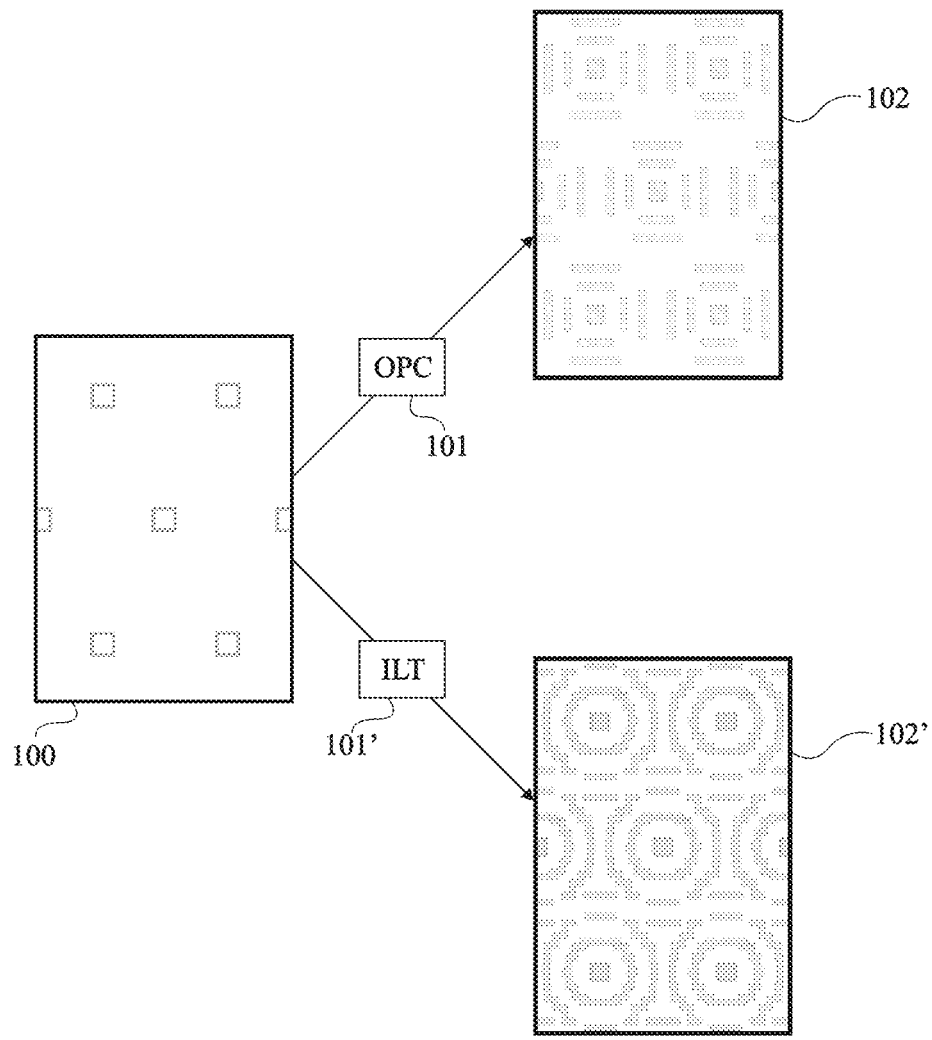
FIG. 1 illustrates an example of an image containing patterns, and masks enabling obtainment of patterns during a photolithography operation.

FIG. 1 illustrates an example of an image 100 containing patterns and masks 102 and 102' enabling obtainment of patterns during a photolithography operation.

To ease the illustration, the patterns of image 100 have the same square shape, although in practice the patterns may have various shapes. As an example, image 100, and the patterns forming it, are intended to be copied on a wafer during the design of microelectronic circuits. To be able to accurately copy the patterns of image 100, image 100 is first modified to compensate for the deformations linked to the photolithography step. For example, with no modification of the patters, the corners of the square-shaped patterns may appear to be rounded, the patterns may appear to be narrower than on original image 100, and/or other irregularities may appear. Such distortions of image 100 are not desirable since they may alter the properties of the electronic elements and components thus formed.

Masks 102 or 102' are two alternative examples of patterns more complex than those of image 100 enabling compensation for and correction of alterations linked, for example, to diffraction and to the effects linked to the lithographic process. To compensate for these effects, masks 102 and 102' comprise other patterns than those of image 100. After a lithography step using one of masks 102 or 102', the resulting image on the wafer may be more or less similar to image 100.

First mask 102 is for example obtained by the application of an optical proximity correction (OPC) technique 101. OPC techniques comprise modifying polygonal patterns, for example, the square patterns of image 100, to compensate for the alterations linked to the lithographic operations. These modifications for example comprise adding small additional polygons at strategic locations. OPC techniques have the advantage of having a relatively fast execution. However, for certain applications, the accuracy obtained by these techniques is not sufficient.

Second mask 102' is for example obtained by the application of an inverse lithography technology (ILT) 101'. Masks designed by ILT have an aspect with good resolution. However, this technology is complex and expensive in terms of calculation time, which makes this technology difficult to use in production.

Figure 2:
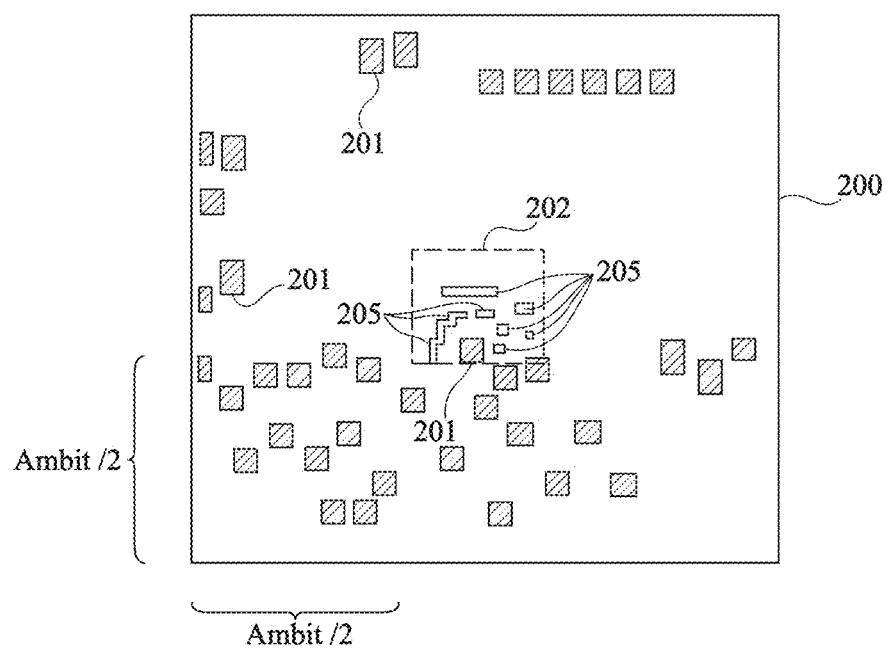
FIG. 2 is an example of an image including patterns and a window for which a mask is generated.

FIG. 2 is an example of an image 200 comprising patterns and a window 202 for which a mask is generated.

Image 200 comprises a plurality of patterns 201. To ease the illustration, the patterns 201 in the example of FIG. 2 have the same square shape, although in practice the patterns may have various shapes. As an example, image 200 shows an embodiment having a 500-nanometer length and width. Although it is desirable to generate a mask for the entire image 200, correlation effects between patterns 201 and alterations due to the diffraction of light do not enable designing of a whole mask at one time. Thus, a single window 202 of image 200 is processed, while taking into according the patterns 201 next to window 202, in particular in an area having a width of at least a value Ambit/2 around window 202, where value Ambit represents the interaction range of the photolithographic simulation model used.

In this example, window 202 contains a single pattern 201. During the processing of window 202 by OPC or by ILT, patterns forming a mask 205 are added around pattern 201 and in window 202. Mask 205 takes into account the correlation effects due to patterns 201 outside of window 202.

To fully process image 200, masks are for example created for a plurality of windows, similar to window 202, and covering image 200. This segmentation into a plurality of windows is processing time consuming.

The processed images are generally shown in vector format such as the GDSII (Graphic Design System) or OASIS (Open Artwork System Interchange Standard) format.

In the applications targeted by the present disclosure, the use of a neural network is provided to generate masks for each window. However, neural networks cannot process images in their vector representation and such images are thus to be represented in another form for use, for example, in an array form. A problem is that the size of the image 200 that can be processed by a neural network of reasonable size is limited.

Figure 3:
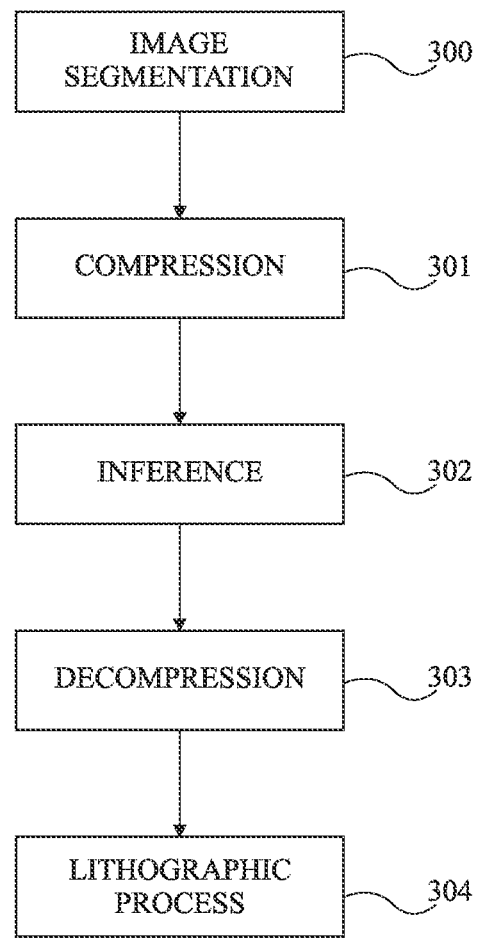
FIG. 3 is a flowchart representing operations of generation of a mask according to an example of embodiment of the present disclosure.

FIG. 3 is a flowchart showing operations of generation of a mask according to an example of embodiment of the present disclosure.

At a step 300 (IMAGE SEGMENTATION), an image, for example, image 100 or image 200, is segmented into a plurality of sub-images, each sub-image comprising a window, such as the window 202 of FIG. 2, for which a mask will be generated. To generate a mask for the whole image, the sub-images are for example overlapping. Each sub-image is for example in a vector representation, although it would also be possible for the sub-image to be in array form.

At a step 301 (COMPRESSION), subsequent to step 300, the representation of each sub-image is compressed into another representation formed of elements described by two points. In particular, each sub-image is for example formed of one or a plurality of polygons, these polygons for example defining opaque areas, and/or transparent areas, of the mask. The compression for example comprises the transformation of at least certain perimetric points of these polygons into elements described by two points.

For example, the sub-images are in vector representation of the polygons, and the transformation comprises a transformation of the vector representation into the representation formed of elements described by two points. In another example, the sub-images are in array representation, and the transformation comprises a transformation of the array representation into the representation formed of elements described by two points.

At a step 302 (INFERENCE), subsequent to step 301, the representation formed of elements described by two points is supplied to a neural network which was previously trained. The neural network then acts in inference on the representation to calculate and determine a mask for the window, under a representation formed of elements described by two points.

At a step 303 (DECOMPRESSION), subsequent to step 302, the representation obtained at step 302 is decompressed, for example, into a vector or array representation to generate a photolithographic mask image for the window of each sub-image. In particular, each element described by two points of the representation is for example transformed into a point in the vector or array representation, and polygons are for example reconstructed from these points.

A plurality of windows are thus processed, until a mask covering the original image is obtained. In other cases, it would also be possible to generate masks for certain windows of certain sub-images.

The mask image obtained at step 303 is for example transmitted to a manufacturing site to be used in the manufacturing of electronic devices at a step 304 (LITHOGRAPHIC PROCESS). For example, the mask image is printed on a support, and the photolithographic mask thus obtained is then used in a photolithography process. As an example, light radiations are projected through the photolithographic mask and towards photoresist covering a substrate of a wafer. The irradiated photoresist is then submitted to an etching process to form patterns in the substrate.

Figure 4:
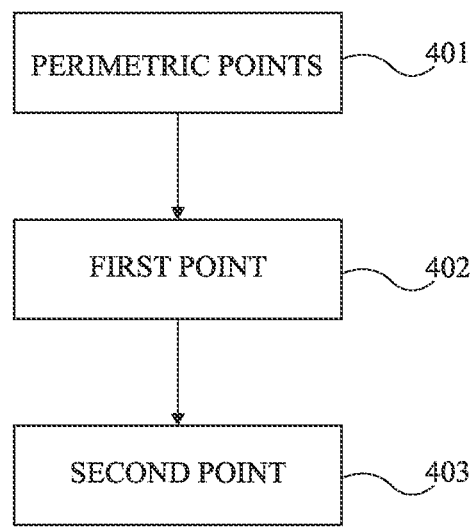
FIG. 4 is a flowchart representing operations of compression of an image into a representation formed of elements described by two points.

FIG. 4 is a flowchart representing an example of operations of compression of an image into a representation formed of elements described by two points. In particular, the image contains at least one polygon and is for example represented in vector format.

At a step 400 (PERIMETRIC POINTS), perimetric points are determined for each polygon. These points for example include the vertices of each polygon, and certain points on the edges of the polygons. For example, an array image showing these perimetric points is generated.

Each of these perimetric points is then projected, at a step 402 (FIRST POINT), onto a first curve running throughout a first surface. The first surface is for example a rectangle or a right-angled rectangle and is described by the curve. Each perimetric point is then identified by a first point corresponding to a point of the first curve present in a neighborhood of the projection of the perimetric point.

Each perimetric point is then identified by a second point at a step 403 (SECOND POINT), towards a second curve running throughout a second surface in the vicinity of the first point. The second point is selected, for example, as being a point of the second curve closest to the projected point. Thus, the second point of each element described by two points provides an additional accuracy level with respect to the first point.

Figure 5:
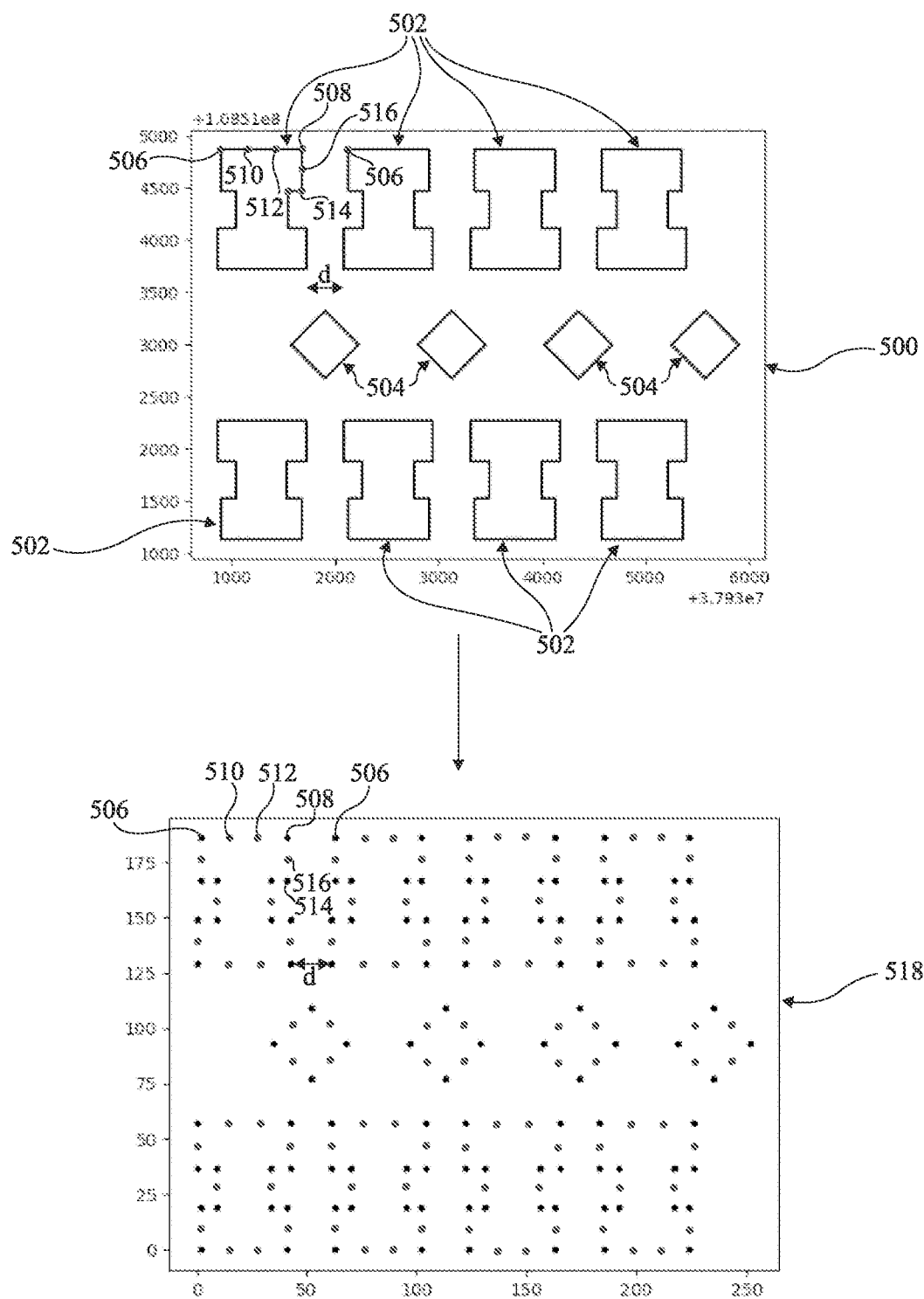
FIG. 5 illustrates an operation of an image compression method according to an example of embodiment of the present disclosure.

FIG. 5 illustrates an example of an operation of a method of compression of an image 500.

In the example of FIG. 5, image 500 is a vector representation of eight polygons 502 arranged in two rows of four polygons, and of four polygons 504 arranged in a row between the rows of polygons 502. Each polygon 502 and 504 is distant from the other polygons 502, 504 by at least a minimum distance d.

To compress image 500 into a representation formed of elements described by two points, perimetric points, for each polygon are for example determined as points to be converted. For example, each vertex of each polygon 502 and 504 forms part of these perimetric points. Further, to maintain the structure and the unity of each polygon, perimetric points of the edges of the polygons having a length greater than value d are determined, for example, as points to be converted. Indeed, the determined perimetric points enable, for example, image 500 to be reconstructed, by linking, from an initial peripheral point, the closest points to return to the initial perimetric point. As an example, points 506 and 508 are two vertices of the upper edge of polygons 502 separated from each other by a distance greater than distance d. Thus, points 510 and 512 belonging to the edge linking vertices 506 and 508 are also determined as points to be converted. Similarly, another edge of polygons 502, having a length greater than d, links vertex 508 to a vertex 514. Now, vertex 508 is at a distance d from the vertex 506 of the neighboring polygon 502. A point 516 of the edge and at a distance shorter than d from vertices 508 and 514 is thus also determined as to be converted. Point 516 enables maintaining the unity of polygons 502 as, indeed, without point 516, the vertices 508 of each polygon would be linked to the top 506 of the neighboring polygon 502.

The perimetric points thus determined are illustrated in a frame 518 at the bottom of FIG. 5. Frame 518 is in an array representation of the points determined to be converted.

Figure 6A:
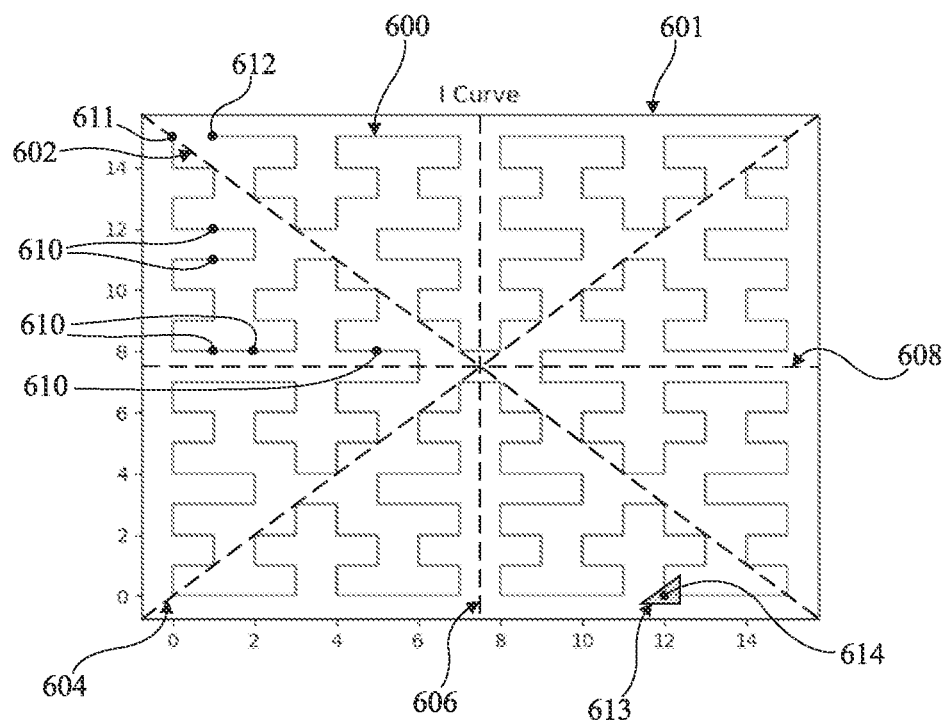
FIG. 6A illustrates an example of two-point compression of a perimetric point of a polygon.
Figure 6B:
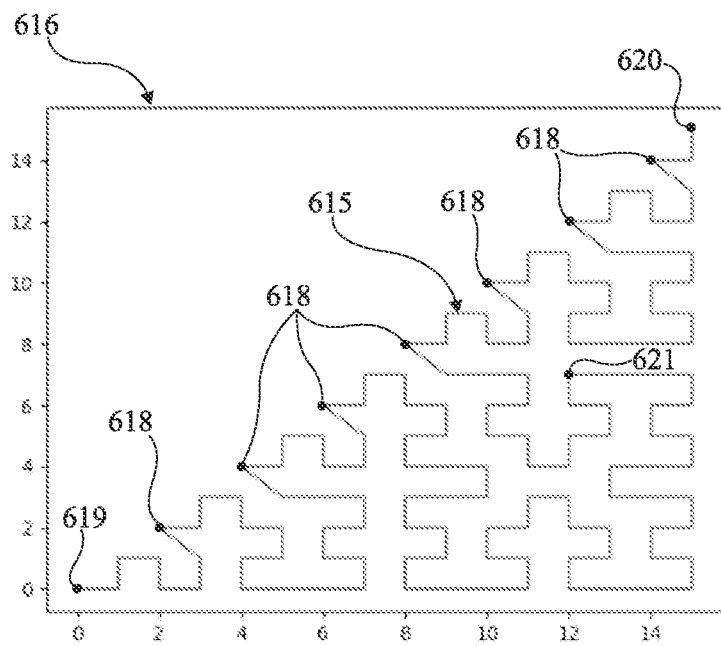
FIG. 6B illustrates in further detail an example of the generation of a second point of the two-point compression of FIG. 6A.

FIGS. 6A and 6B illustrate examples of the first and second surfaces and of the first and second curves used during the conversion to a two-point element of a perimetric point of a polygon, as described in relation with the steps 402 and 403 of FIG. 4.

In particular, FIG. 6A illustrates a curve 600 (I Curve) running throughout a surface 601 defined in a space of size 16 by 16. Curve 600 runs throughout surface 601 to allow the representation of any point in this surface by a point of curve 600. Further, the path of curve 600 is for example selected so that there is a certain correlation between the value of a point in the curve, and the position of the corresponding point in surface 601. The example of FIG. 6A exhibits symmetries along diagonal axes 602, 604, along a vertical axis 606, and along a horizontal axis 608, thus cutting curve 600 into eight portions which each runs throughout one of the eight identical right-angled triangles. Further, curve 600 is formed of points forming either right angles or straight lines. Curve 600 is formed of 256 points in the example of FIG. 6A, although it may be formed of another number of points, such as being equal to a power of two. Examples of points 610 on straight lines are shown for the right-angled triangle at the top left of FIG. 6A. In the example of FIG. 6A, each point is then distant by one unit from the previous point and from the next point in curve 600. Further, each point is for example identified by an integer, ranging from 0 to 255, and representing the location of the point in curve 600. A starting point 611 of curve 600 is, in the example of FIG. 6A, in a corner of surface 601 at coordinates (0, 15) although other starting points are possible. The starting point 611 of curve 600 is then identified, for example, by integer 0. Similarly, a point of arrival 612 is similarly defined and is, in the example of FIG. 6A, located at coordinates (1, 15) and is identified, for example, by integer 255.

In the example of FIG. 6A, a perimetric point, for example, one of the points of FIG. 5, is projected onto the surface defined by curve 600 and is located in a neighborhood 613 of a point 614 of curve 600. Thus, the integer describing point 614 is assigned as the first point of the description of the considered perimetric point in the representation formed of elements described by two points.

In the example of FIG. 6A, neighborhood 613 is a right-angled triangular surface, but other types of surfaces may be used.

To provide a second level of accuracy to the compression, a second curve 615, illustrated in FIG. 6B, runs throughout the neighborhood 613 of point 614 to enable defining the points of neighborhood 613 and thus providing a second level of accuracy to the compression of a perimetric point.

In the example of FIG. 6B, neighborhood 613 is then described by a right-triangle having a length and a width of size 16. Further curve 615 is constructed similarly to curve 600, with the difference being that some of the points 618 of curve 615 located on the diagonal of the right-angled triangle form 45° angles. Curve 615 is then formed of points on straight lines, of points forming right angles, and points 618. In the example of FIG. 6B, curve 615 contains 136 points, each identified by an integer, similarly to the points of curve 600. A starting point 619, for example, located at coordinates (0,0), is for example identified by integer 0 and an arrival point 620, for example, located at coordinates (15, 15), is for example identified by integer 135.

In the example of FIG. 6B, the perimetric point described by the integer identifying first point 604 is then described by the integer assigned, for example, to a second point 621 of curve 615. Indeed, point 621 is for example the point closest to the point to be compressed in the description of the neighborhood 613 of point 614.

In the example of FIGS. 6A and 6B, neighborhood 613 is triangular in shape. However, other shapes would be possible, such as for example a rectangular shape. In this case, an additional bit is added to the first point describing the considered perimetric point. As an example, the bit has value of 0 if the point is located in the lower triangular portion of neighborhood 613, as illustrated in FIG. 6B, or has value of 1 if the point is located in the upper triangular portion of the neighborhood, or conversely.

The methods of FIGS. 3 and 4 are for example implemented by a dedicated data processing device, such as a hardware accelerator.

FIGS. 7 to 10 describe the operation and the training of a neural network 712 configured to generate photomasks, based on a representation, for example, a vector representation, of a target image.

Figure 7:
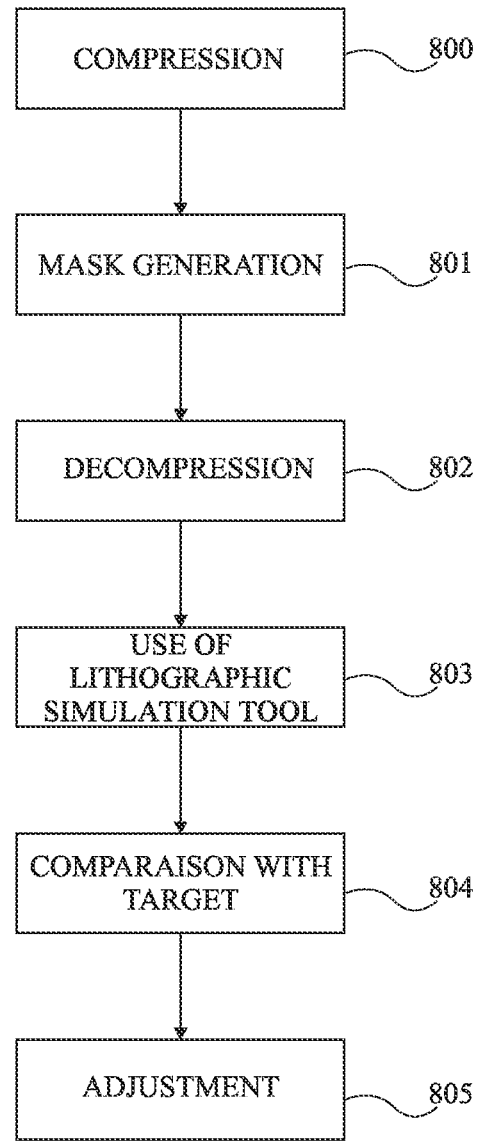
FIG. 7 is a flowchart illustrating operations of a neural network training method according to an example of embodiment of the present disclosure.

FIG. 7 is a flowchart illustrating operations of a method of training neural network 712 according to an example of embodiment of the present disclosure. The method is implemented for example by a dedicated data processing device.

FIG. 7 illustrates steps occurring during an iteration of a non-supervised training algorithm. In certain cases, these steps are repeated a plurality of times, in practice thousands of times, to fully train neural network 712.

At a step 800 (COMPRESSION), a target image, for example, in vector form, is compressed into a representation formed of elements described by two points. The compressed image is then supplied to the neural network as input data.

At a step 801 (MASK GENERATION), neural network 712 generates a new representation formed of elements described by two points based on the compressed image.

At a step 802 (DECOMPRESSION), the new representation is decompressed to the format of the input image. The image thus decompressed represents an estimate of a photolithographic mask enabling obtainment of the target image after a photolithographic operation.

At a step 803 (USE OF LITHOGRAPHIC SIMULATION TOOL), the mask image obtained at step 802 is submitted to a simulation tool 714. Simulation tool 714 is configured to apply optical rules, enabling estimation and simulation of the patterns obtained by the use of the generated mask image. Simulation tool 714 for example delivers an image of the estimated patterns. In certain embodiments, the simulation tool uses OPC rules. As an example, the simulation tool is based on the application of two successive models to predict the image of the estimated patterns. A first model predicts an image at the top of the photoresist resulting from the passage of light through the mask. A second model predicts the image resulting from the chemical reaction of photoresist to the exposure to light and from the removal of the portion of the photoresist having reacted.

At a step 804 (COMPARISON WITH TARGET), differences between the image of the estimated patterns generated by the simulation tool and the target image are quantified. For example, along the process of training of neural network 712, the patterns estimated by the simulation tool will exhibit differences with the target image. These differences are for example quantified by a loss function based on an error level between the image of estimated patterns and the target image. For example, this error level is estimated by counting the number of different pixels between the target image and the image of the estimated patterns, although, in other cases, other estimation techniques may be used, such as an error surface area calculation. The closer the loss is to zero, the more the obtained patterns correspond to the target image.

At a step 805 (ADJUSTMENT), parameters of the neural network, such as synaptic weights, are adjusted according to the value of the loss calculated at step 804. The adjustment is for example performed according to a gradient backpropagation (or descent) method, well known by those skilled in the art.

Steps 800 to 805 are then repeated during other iterations of the algorithm, based on a same target image and also based on other target images. The training for example ends once a number of iterations have been performed, or when the loss no longer varies during a fixed number of iterations.

Figure 8:
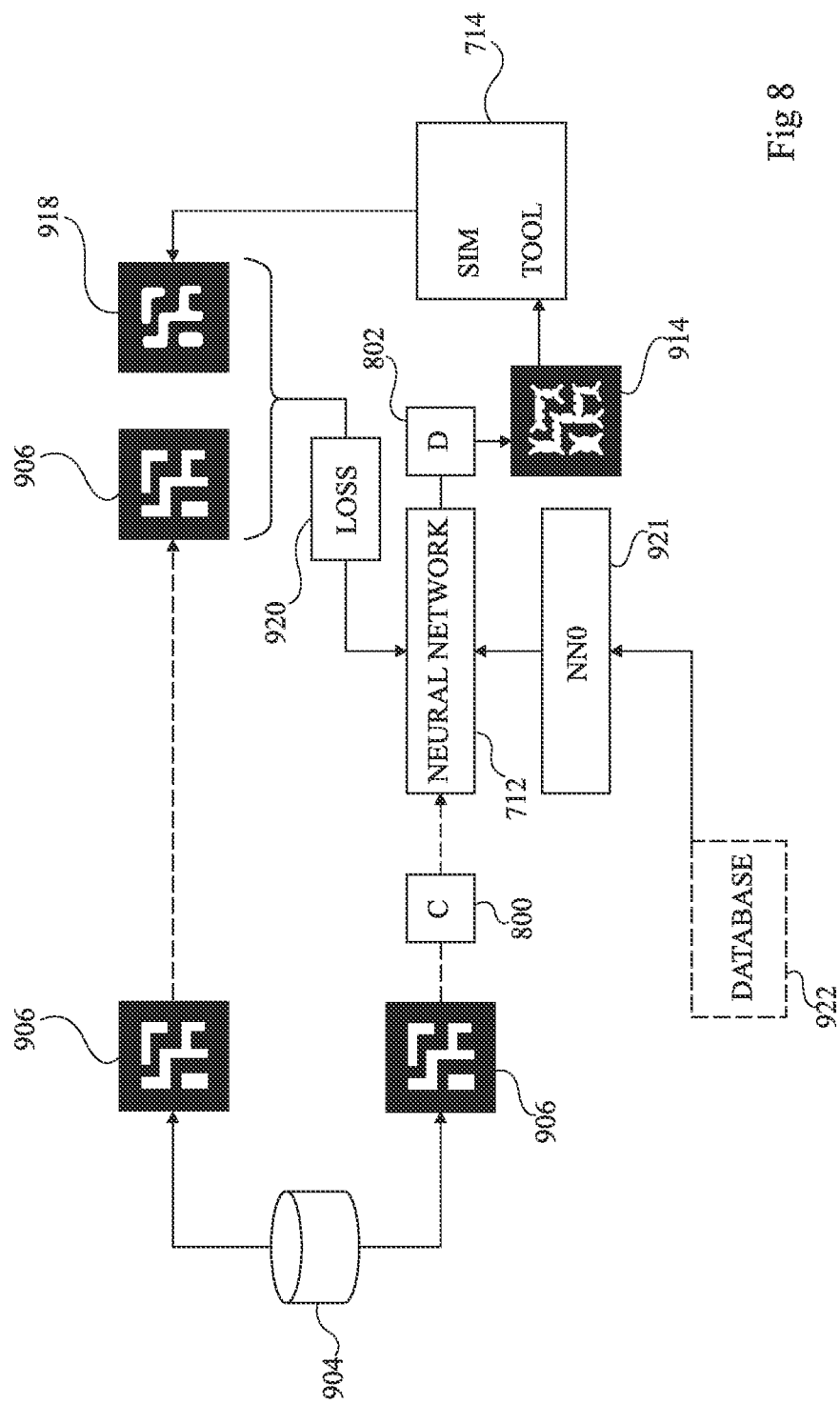
FIG. 8 illustrates a neural network training method according to an example of embodiment of the present disclosure.

FIG. 8 illustrates a first detailed example of the method of FIG. 7 of training of neural network 712.

In certain embodiments, neural network 712 is initially preconfigured, for example via a supervised pretraining. Network 712 is then no longer initially blank, in that parameters of network 712, such as the synaptic weights, are then partially adjusted to facilitate the training of network 712.

An image 904 formed of a plurality of patterns, for example, stored in a volatile memory of the device implementing the method in a vector format (GDSII), is divided into a plurality of target sub-images according to the method described in relation with FIG. 2. One target sub-image 906 from among the plurality of target sub-images is then compressed into a representation formed of elements described by two points. The compression is for example performed in an implementation of the step 800 described in relation with FIG. 7 according to the embodiment described in relation with FIGS. 5, 6A, and 6B.

The representation formed of elements described by two points of sub-image 906 is then supplied to neural network 712. Neural network 712 is for example implemented according to a generative model, such as an autoencoder, although other implementations are possible. Neural network 712 generates, in an implementation of step 801, a new representation formed of elements described by two points. As an example, neural network 712 receives, in addition to the representation, random data for example generated by a random number generator. For example, the random data are used to help the forming of patterns of mask 914.

The new representation is then decompressed, in an implementation of step 802, into a mask estimate 914 for sub-image 906. Mask estimate 914 is represented by a vector image, for example, of GDSII type.

Mask estimate 914 is then supplied to simulation tool 714 which, in an implementation of step 803, generates an image 918 representing a simulation of the patterns obtained by photolithography via the use of mask 914.

Image 918 is then compared with target sub-image 906, in an implementation of step 804. The comparison is for example quantified by the calculation of a loss by applying a loss function 920 (LOSS). The loss function is for example a quadratic function applied to the error level described in relation with FIG. 7. The loss thus calculated enables adjustment of the parameters, such as the synaptic weights, of neural network 712. The adjustment is for example performed by the gradient descent method.

The process then resumes with the delivery of the same sub-image 906 or of a different sub-image enabling again readjustment of the parameters of network 712 via the generation of new mask images and of loss calculation.

In the example illustrated in FIG. 8, the training of network 712 is performed in non-supervised fashion.

To accelerate and to facilitate the training of neural network 712, a pretraining precedes the training of neural network 712. As an example, the pretraining of the network is performed is supervised fashion and is implemented by a program 921 (NNO), for example stored in a non-volatile memory of the device implementing the method. The pretraining is for example performed by execution of transfer learning.

The pretraining is for example performed by a database 922 (DATABASE). The database is for example temporarily stored in the volatile memory of the device implementing the method. Database 922 contains target images as well as masks enabling obtainment of the target images by photolithography. The masks of the database are for example masks obtained by application of ILT on the target images. As described in relation with FIG. 1, masks obtained by ILT have good resolution, but their generation is time consuming. Thus, the construction of database 922 is also time consuming but is only performed once, before the training of neural network 712.

Once trained, neural network 712 is then capable of rapidly providing a mask for a given target image having a resolution for example equivalent to that of masks constructed by ILT.

Figure 9:
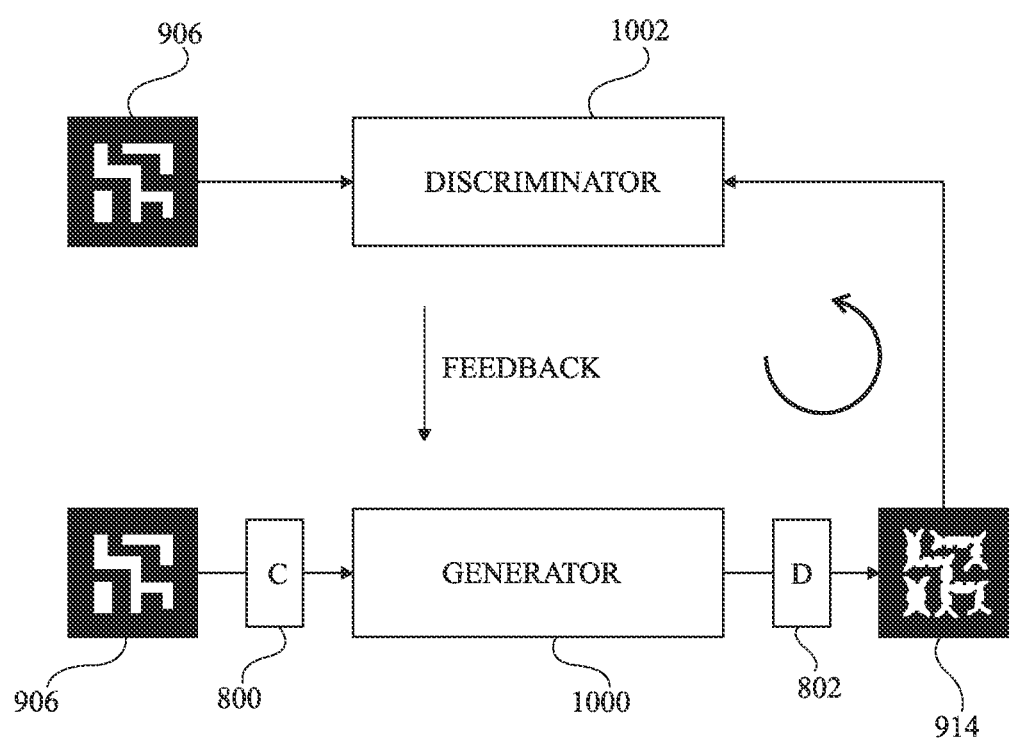
FIG. 9 illustrates a neural network training method according to another example of embodiment of the present disclosure.

FIG. 9 illustrates a neural network training method according to another example of embodiment of the present disclosure.

In particular, FIG. 9 illustrates a training method when the neural network is a generative adversarial network (GAN). The network then comprises two sub-networks, a generator network 1000 (GENERATOR) and a discriminator network 1002 (DISCRIMINATOR).

Discriminator network 1002 receives target sub-image 906, for example, in vector format, such as the GDSII format, and generator network 1000 receives the representation formed of elements described by two points of target sub-image 906. Generator network 1000 is configured to generate, based on the representation, a new representation formed of elements described by two points. The new representation is decompressed and mask image 914 is thus obtained. Image 914 is then supplied to discriminator network 1002. Discriminator network 1002 also receives other images of masks, for example generated by an ILT tool, for target image 906. The discriminator network is configured to estimate, based on target image 906 and from among the delivered images, which have been generated by the generator and which have been generated by the ILT tool.

Discriminator network 1002 then feeds back (FEEDBACK) its estimate to generator network 1000, and also receives the truth concerning that which, among generator 1000 and the ILT tool, has generated each mask image. A loss for each of the two networks 1000 and 1002 is then calculated and the parameters, such as synaptic weights, of each of the two networks are then adjusted, according to the loss which is assigned thereto.

The two networks 1000 and 1002 operate in competition with each other, the aim of generator 1000 being to deceive discriminator 1002 by predicting images 914 close to the ILT masks. The aim of discriminator 1002 then is to see through the game of generator 1000 and thus to well discriminate predicted images from real ILT masks.

It is for example provided that, in their initial state, the two networks are at an equal level. Indeed, if one of the two networks has a higher performance than the other, it will risk always winning and preventing the other network from progressing. Accordingly, the higher-performance network will also risk not progressing.

The two networks 1000 and 1002 are for example autoencoders, and more particularly autoencoders of U-net type. Other implementations are of course possible and are within the abilities of those skilled in the art.

Figure 10:
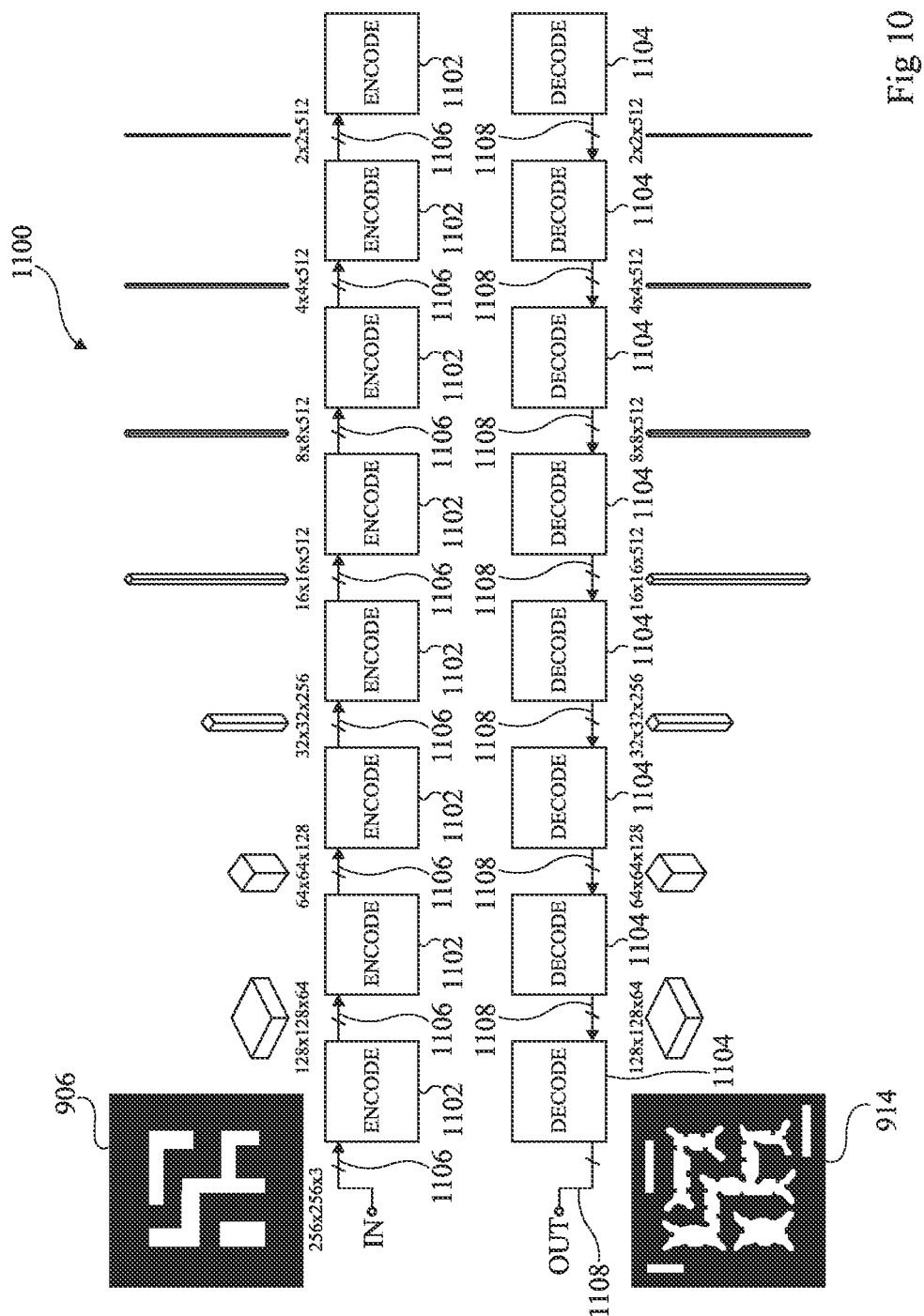
FIG. 10 is an example of implementation of a neural network.

FIG. 10 is an example of implementation of a neural network. In particular, FIG. 10 illustrates a network 1100 of autoencoder type.

Autoencoder 1100 is for example used as implementation of the neural network of FIG. 8 and/or of the generator network 1000 and/or of the discriminating network 1002 described in relation with FIG. 9. Autoencoder 1100 breaks down into an encoder portion, comprising a plurality of neuron encoding layers 1102 (ENCODE), and into a decoder portion, comprising a plurality of decoding neuron layers 1104 (DECODE). In the example of FIG. 10, autoencoder 1100 contains eight encoding layers and 8 decoding layers, although it is possible to vary the number of layers.

In the example of FIG. 10, the encoder receives as an input (IN) image 906 having a size of 256 by 256 pixels, and the decoder outputs (OUT) image 914 having the same size as image 906. However, this is an example only and any input and output image size would be possible.

Arrows 1106 between each encoding layer 1102 represent sub-sampling operations where pixel blocks are for example combined by the generation of an average pixel value for the pixels in the block or by taking the value of the peak pixel among the pixels in the block. In the example of FIG. 10, the sub-sampling implies a combination of blocks two by two of pixels providing a decrease by a factor 4 in the image size. Thus, the encoder decreases the dimensions of image 906. Between each sub-sampling operation 1106, each encoding layer 1102 for example comprises the application of convolutional filters, however other types of filters may be applied.

Once the eight sub-sampling operations have been carried out, autoencoder 1100 manipulates 512 images having a size of 2 by 2 pixels. The manipulated image is then supplied to the decoding portion of autoencoder 1100.

Arrows 1008 show oversampling operations where pixel blocks are for example duplicated a given number of times to increase the image size. For example, the duplication of a pixel once in each direction causes an increase in the image size by a factor 4, since each pixel becomes four pixels. Thus, the decoder increases the dimensions of the manipulated image. Between each oversampling operation 1108, each encoding layer 1104 for example comprises the application of convolutional filters, however other types of filters may be applied.

According to an embodiment, autoencoder 1100 is of U-net type. However, many variants concerning the implementation of autoencoder 1100 are within the abilities of those skilled in the art.

An advantage of the described embodiments is that once the neural network has been trained, the generation of a mask having a quality similar or equivalent to the quality of a mask obtained by high-performance tools, such as an ILT tool, is fast to perform.

Various embodiments and variants have been described. Those skilled in the art will understand that certain features of these various embodiments and variants may be combined, and other variants will occur to those skilled in the art.

Finally, the practical implementation of the described embodiments and variants is within the abilities of those skilled in the art based on the functional indications given hereabove. In particular, other neural network architectures than that discussed may be used. Further, the loss associated with a prediction of the network may be calculated differently from the way described in relation with FIG. 8. Finally, the pretraining of the network is an optional step and its implementation may be different from the implementation described in relation with FIG. 8. These variants are within the abilities of those skilled in the art.

The invention claimed is:

1. A method, comprising:
   compressing, by a processor, an image comprising first patterns, by transforming the image into a first representation formed of two-point elements, the image covering a surface contained in a plane;
   wherein the image is compressed by:
      projecting a vertex of a first polygon of the image onto a first point of a first curve running throughout a first surface of the plane; and
      projecting the vertex onto a second point of a second curve running throughout a second surface around the first point, the second surface having an area smaller than the area of the first surface;
   executing, by a neural network, an inference operation on the first representation to generate a second representation formed of two-point elements; and
   generating a lithographic mask based on decompression of the second representation.

2. The method according to claim 1, further comprising using the lithographic mask to obtain patterns on a photoresist covering a substrate of a wafer by lithography and then performing an etching process to form corresponding patterns in the substrate.

3. The method according to claim 1, wherein the image is represented in vector format.

4. The method according to claim 1, wherein the first surface and/or the second surface is a rectangle.

5. The method according to claim 1, wherein the first surface and/or the second surface is a right-triangle.

6. The method according to claim 1, wherein the first surface and/or the second surface comprises a first right-triangle and a second right-triangle arranged as a rectangle, and the first representation comprises a bit indicating in which of the first right-triangle and the second right-triangle the first point and/or the second point is located.

7. The method according to claim 1, wherein the first surface is a rectangle and the second surface comprises at least one right-triangle.

8. The method according to claim 1, wherein the image is formed of a plurality of polygons, the compression comprising two-point compression of each vertex of each polygon and two-point compression of at least certain perimetric points of each polygon which are not vertices.

9. The method according to claim 8, comprising comparing a length of each edge of each polygon with a threshold length and, when the length of an edge exceeds the threshold length, compressing at least one perimetric point on this edge.

10. The method according to claim 9, wherein the threshold length is shorter than a minimum distance separating any two polygons from among the plurality of polygons.

11. The method according to claim 1, further comprising segmenting the image into a plurality of sub-images, said steps of compressing and generating the mask being applied to each of the sub-images.

12. A method, comprising:
training a neural network to generate lithographic masks by:
  generating, at least partially by the neural network, an image representing a lithographic mask;
  wherein generating the image representing a lithographic mask comprises projecting a vertex of a first polygon onto a first point of a first curve running throughout a first surface of a plane and projecting the vertex onto a second point of a second curve running throughout a second surface around the first point, the second surface having an area smaller than the area of the first surface;
  estimating, by using a lithographic simulation tool, a pattern resulting from the use of the mask;
  comparing the resulting pattern and a reference pattern; and
  modifying one or a plurality of parameters of the neural network based on the comparison; and
printing the image representing the lithographic mask on a support to produce the lithographic mask.

13. The method according to claim 12, wherein generating the image comprises:
compressing, by an algorithm implemented by a data processing device, a first image containing first patterns by transforming the image into a first representation formed of two-point elements;
applying the first representation to the neural network to generate a second representation formed of two-point elements; and
generating the image based on a decompression of the second representation.

14. The method according to claim 12, wherein the neural network is a generative adversarial network comprising a generator network being a first autoencoder and a discriminator network being a second autoencoder.

15. The method according to claim 14, wherein the first autoencoder and/or the second autoencoder is of U-net type.

16. The method according to claim 12, wherein the training of the neural network is performed iteratively, and, at each iteration:
a loss is calculated, by using a loss function, based on the comparison between the resulting pattern and the reference pattern; and
modifying one or a plurality of parameters of the network comprises updating of synaptic weights of the neural network based on the calculated loss.

17. The method according to claim 12, further comprising using the lithographic mask to obtain patterns on a photoresist covering a substrate of a wafer by lithography and then performing an etching process to form corresponding patterns in the substrate.

* * * * *